No. 878,051. PATENTED FEB. 4, 1908.
E. G. EBERHARDT.
MECHANICAL MOVEMENT.
APPLICATION FILED MAY 21, 1907.
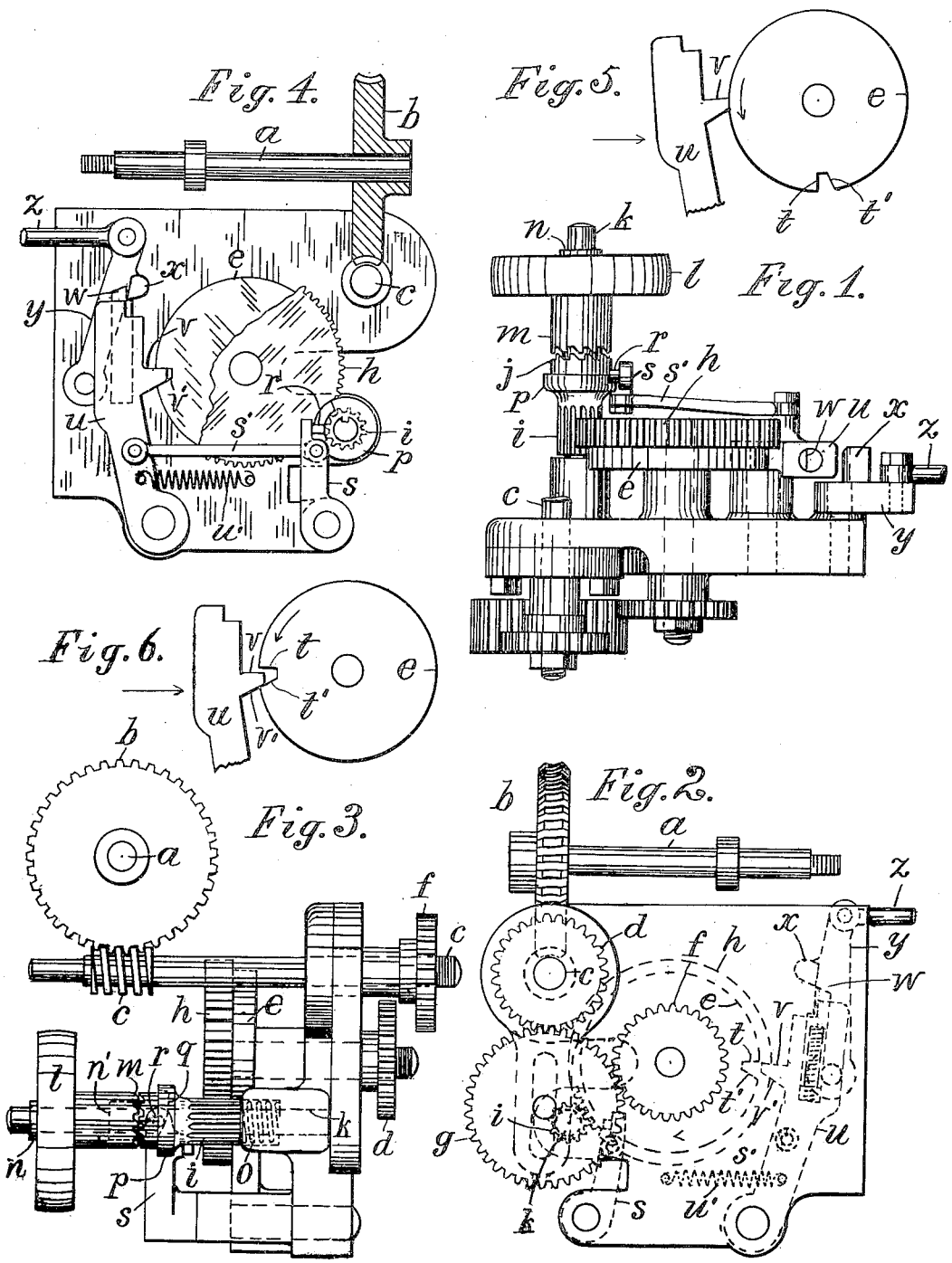
Witnesses:
Inventor.
Elmer G. Eberhardt,
per Thomas S. Crane, Atty

UNITED STATES PATENT OFFICE.

ELMER G. EBERHARDT, OF NEWARK, NEW JERSEY, ASSIGNOR TO EBERHARDT BROTHERS MACHINE COMPANY, OF NEWARK, NEW JERSEY, A CORPORATION OF NEW JERSEY.

MECHANICAL MOVEMENT.

No. 878,051.           Specification of Letters Patent.           Patented Feb. 4, 1908.

Application filed May 21, 1907. Serial No. 374,825.

*To all whom it may concern:*

Be it known that I, ELMER G. EBERHARDT, a citizen of the United States, residing at 113 Orchard street, Newark, county of Essex, and State of New Jersey, have invented certain new and useful Improvements in Mechanical Movements, fully described and represented in the following specification and the accompanying drawings, forming a part of the same.

The present invention relates to a mechanical movement which is especially applicable for the automatic indexing mechanism of gear-cutters, milling machines, and analogous constructions, in which a spindle is rotated through a definite arc of the circle. In such automatic indexing mechanisms, it has been common to employ a continuously rotated pulley to actuate the mechanism and to connect the same by a detachable clutch with the gearing for rotating the spindle.

To arrest the movement of the gearing when the spindle is rotated through the desired arc, it has been common to employ a rotary stop-disk with a notch or tooth thereon adapted to be engaged by a movable stop-piece when the spindle has been turned through the requisite arc. By arranging the gearing to rotate the disk once during such arc movement of the spindle, the stopping of the disk arrests the movement of the spindle and the movement of the stop-piece by falling into a notch in the disk, may be utilized to disconnect the clutch upon the driving-pulley. Three constructions have been employed in connection with such mechanism, but all of such constructions fail to rotate the spindle in the exact manner required for indexing the work-piece in a gear-cutter or milling machine. In the first construction, a notch in the disk simply permits a movement of the stop-piece to disconnect the clutch, and although it shifts the clutch by operating the clutch-lever, the accuracy of the indexing depends upon the moment of separation, and this in turn produces an incorrect result, which depends in a great degree upon the momentum of the parts. In another construction, a latch is employed in connection with the stop-disk and stop-piece, to lock the stop-piece in place to prevent any further movement of the stop-disk. This construction also depends upon momentum to bring the clutch-teeth apart, and the stop-disk up to the point at which the latch operates, and when any variation in the momentum arises, due to friction or other resistances, the latch does not operate and the indexing is inaccurate.

Another device has been used which employs an independent "flexible" operated cam and lever to move the stop-disk up to the stop-piece at the moment of and after the clutch-teeth separate. This device does not depend upon momentum, and operates as well when the machine is running at one speed as another; but involves a complication of parts, which it is the object of the present invention to avoid.

In the present invention, the notch in the stop-disk is made upon one side with a radial surface and with an opposite sloping surface, upon the side toward which the stop-disk is rotated, and the movable stop-piece (having on one side a perpendicular stop-surface, and upon its opposite side a slope corresponding to the notch) is connected with the clutch-unlocking device and pressed normally by a spring toward the rim of the disk. The stop-piece therefore drops automatically into the notch near the end of one rotation, which causes the withdrawal of the clutch from the driving-pulley; and in case the clutch becomes detached before the stop-disk makes an entire rotation, the sloped side of the stop operates to move the disk to the required point, when it is completely arrested by the perpendicular side of the stop, which sets at right angles to the disk's movement. Such final movement of the stop-piece is performed by the spring, independent of the momentum of the other parts, and thus operates with certainty and uniformity to complete the rotation of the spindle in the required arc. This construction for the stop-disk and the stop-piece can be combined with any train of gearing which is used in a dividing engine of any kind, and is therefore illustrated herein in a diagrammatic manner, which shows in a simple form the connection between the continuously running pulley and the spindle upon which the dividing gear-wheel is fixed.

In the drawing, Figure 1 is a plan of the mechanism with the spindle and its driving-worm omitted; Fig. 2 is an elevation of the same viewed from the outside of the frame-plate; Fig. 3 is an edge view of the same viewed from the left side of Fig. 1; Fig. 4 is an elevation viewed from the inner side of the frame-plate; Fig. 5 is a diagram of the stop-disk illustrating the stop-piece retracted; and Fig. 6 a diagram showing the stop-piece rotating the disk.

The spindle which requires intermittent rotation is shown at $a$, and is provided with the usual worm gear-wheel $b$. The shaft and the worm for driving the worm wheel $b$ are lettered $c$, and the shaft has a gear-wheel $d$ upon the end to connect by change-wheels with the stop-disk. The stop-disk $e$ is connected by a gear-wheel $f$ and an intermediate gear $g$ with the gear-wheel $d$, the three gears being changeable and adjustable to vary the relative speed of the worm-shaft and the stop-disk. The stop-disk is connected with a gear-wheel $h$ which is shown driven by a pinion $i$ having a clutch-block $j$ upon one end and fitted to turn freely upon a shaft $k$. A pulley $l$ is fitted to run continuously upon the shaft, and provided upon its hub with a clutch $m$ to engage the clutch $j$. The pulley $l$ and clutch $m$ rotate between collars $n$, $n'$, fixed upon the shaft, and the pinion $i$ and clutch $j$ are pressed normally toward the clutch $m$ by a spring $o$ fitted between the end of the pinion and the bearing of the shaft $k$.

A collar $p$ is shown fixed upon the clutch $j$, and a sloping notch $q$ formed in its face to engage a clutch-shifting pin $r$ upon a movable clutch-lever $s$. The clutch-lever moves the pin toward and from the shaft $k$, and when the pin is pressed toward the clutch it falls into the notch $q$ and the rotation of the clutch moves the sloping face of the notch against the pin and retracts the clutch-teeth in opposition to the spring $o$. The stop-disk is formed with a notch having the radial side $t$ and the sloping side $t'$, such sloping face being upon the side of the notch toward which the disk is turning, as indicated by the adjacent arrow. A stop-lever $u$ is hinged adjacent to the edge of the stop-disk and provided with the stop-piece or tooth having the perpendicular side $v$ and having an opposite side $v'$ sloped correspondingly to the side $t'$ of the notch.

A spring $u'$ presses the stop-piece toward the edge of the disk. A spring-pawl $w$ is seated in the upper end of the lever $u$, and a dog $x$ is formed upon an arm $y$ which is fitted adjacent to the pawl and operates to engage the same, as shown in Fig. 4, when moved forwardly. A "pull-out-rod" $z$ is shown connected with the arm $y$ to oscillate the dog when the spindle requires a partial rotation; the dog slipping off of the pawl at the completion of such movement, and permitting the stop-lever $u$ to be immediately pressed again toward the edge of the disk by its spring $u'$, as shown in Fig. 5. The stop-lever $u$ is linked to the clutch-lever $s$ by a connecting-rod $s'$, and such retraction of the stop-piece from the edge of the disk simultaneously retracts the pin $r$ from the notch $q$ and leaves the spring $o$ free to engage the clutch $j$ with the rotating clutch $m$. The momentary retraction of the stop-piece thus causes an immediate rotation of the disk, while the release of the arm $y$ from the dog $x$ permits the stop-piece to rest upon the disk during its movement, until the notch comes again opposite to the stop-piece. The stop-piece is then pressed progressively into the notch by the action of the spring $u'$, which simultaneously permits the pin $r$ to retract the clutch $j$ and disconnects the motive power from the stop-disk. If such disconnection of the clutch occurs before the stop-disk is rotated a complete revolution, the sloping face $v'$ upon the stop-piece presses upon the sloping side $t'$ of the notch in the disk as shown in Fig. 5, and forces the disk to complete its rotation until the radial face $t$ rests upon the perpendicular face $v$ of the stop.

Slight variations in the disengagement of the clutch have always been liable to occur in this class of dividing mechanism, but they produce no injurious effect when the peculiar form of stop is employed, which I have just described, as the sloping face $v'$ of the stop-piece operates to press the stop-disk in the same direction in which the clutch acts to to rotate it, and thus completes the movement positively, without the exertion of any material force on the part of the stop-piece. This enables a relatively light spring to be used at $u'$ for actuating the stop-lever $u$, and greatly reduces the resistance opposed to the rod $z$, which in gear-cutting and milling machines is commonly pulled by the cutter-carriage of the machine, and necessitates a needless consumption of power if much resistance be opposed to its movement.

It will be noticed that the arm $y$ has a detachable dog and pawl connection with the stop-lever, so that when the arm is actuated by the pull-out $z$, the stop is momentarily withdrawn from the notch in the disk and is instantly pressed again toward the edge of the disk by the spring $u'$. The shifting pin $r$ operates, when any portion of it enters the sloping notch $q$, to separate the clutch parts from one another and stop the positive motion of the disk, and such operation of the shifting pin occurs when the stop-piece partly enters the notch in the disk, so that the positive motion of the disk is arrested before the stop-piece has fully entered the notch. The momentum of the stop-disk and all its connected parts has a certain effect in continuing the rotation of the stop-disk, although such effect is not the same when the mechanism is operated at diverse speeds. The exact rotation of the disk is, however, effected by the final movement of the stop-piece, which is pressed positively into the notch by the spring $u'$, so that its sloping face produces a continued rotation of the disk until the radial face of the notch is in contact with the perpendicular side of the stop-piece. Such side being at right angles to the movement of the disk, forms an exact gage to its rotation, and secures a perfectly uniform movement of the disk upon each actuation of the mechanism. This mechanism may be used for any purpose to which it is adapted, and which is provided with a continuously rotating driver and a detachable connection to the stop-disk.

Having thus set forth the nature of the invention what is claimed herein is:

1. In a mechanical movement, the combination, with a rotary stop-disk having a notch in the edge, of mechanism for rotating the disk a single revolution, a movable stop-piece with a spring for pressing it toward the rim of the disk and having one side perpendicular to the motion of the disk and the opposite side sloped in the direction of the motion, the notch in the disk having a radial side to be arrested by the perpendicular side of the stop-piece and a sloping side coresponding with the sloping side of the stop-piece, the means for pressing the stop-piece into the notch operating to complete the rotation of the disk.

2. In a mechanical movement, a rotary stop-disk with a notch in the edge, means for securing an exact complete rotation of the disk, comprising a clutch rotatable with the stop-disk, a continuously running driver to rotate such clutch, a stop-lever having a stop piece with one side sloped in the direction of the disk's motion and pressed normally toward the edge of the disk, the notch in the disk being correspondingly sloped upon its forward side, and means actuated by the stop-lever for disconnecting the clutch from the rotating driver when the stop-piece has partly entered the notch.

3. In a mechanical movement, a rotary stop-disk with a notch in the edge, means for securing an exact complete rotation of the disk, comprising a gear rotatable with the stop-disk, a pinion for driving such gear having a clutch upon its hub, a continuously running driver with a corresponding clutch, means for pressing the clutch parts normally together, a clutch-lever for retracting the clutch parts when desired, a stop-lever having a stop-piece with one side sloped in the direction of the disk's motion and pressed normally toward the edge of the disk, the notch in the disk being correspondingly sloped upon its forward side, and a connection between the stop-lever and clutch-lever operating when the stop-piece partly enters the notch to disconnect the clutch and stop the positive movement of the disk, its final movement being effected by the sloping face of the stop-piece.

4. In a mechanical movement, a rotary stop-disk with a notch in the edge, means for securing an exact complete rotation of the disk, comprising a gear rotatable with the stop-disk, a pinion for driving such gear having a clutch upon its hub, a continuously running driver with a corresponding clutch, means for pressing the clutch-parts normally together, a clutch-lever for retracting the clutch-parts when desired, a stop-lever having a stop-piece with one side sloped in the direction of the disk's motion and pressed normally toward the edge of the disk, the notch in the disk being correspondingly sloped upon its forward side, an arm adjacent to the stop-lever with "pull-out-rod" for oscillating the same, and a detachable dog and pawl connection between the arm and the stop-lever to automatically release the stop-lever when the stop-piece is pulled from the notch in the disk, and a connection between the stop-lever and clutch-lever operating when the stop-piece partly enters the notch to disconnect the clutch and stop the positive movement of the disk.

5. In a mechanical movement, a rotary stop-disk with a notch in the edge, means for securing an exact complete rotation of the disk, comprising a gear rotatable with the stop-disk, a pinion for driving such gear having a clutch upon its hub, a continuously running driver with a corresponding clutch, means for pressing the clutch-parts normally together, a clutch-lever for retracting the clutch-parts when desired, a stop-lever having a stop-piece with one side sloped in the direction of the disk's motion and pressed normally toward the edge of the disk, the notch in the disk being correspondingly sloped upon its forward side, and the pinion having a collar $p$ with sloping notch $q$ therein, the clutch-lever $s$ having clutch-shifting pin $r$ movable into the path of the collar and engaging the sloping notch, a connection between the stop-lever and clutch-lever for retracting the shifting-pin $r$ from the sloping notch $q$ when the stop-piece is retracted, and means for momentarily withdrawing the stop-lever from the edge of the disk.

In testimony whereof I have hereunto set my hand in the presence of two subscribing witnesses.

ELMER G. EBERHARDT.

Witnesses:
J. E. FELDMAN,
FRANK E. EBERHARDT.